United States Patent [19]

Grossmann et al.

[11] Patent Number: 4,798,001
[45] Date of Patent: Jan. 17, 1989

[54] SAW BLADE FOR A SAW HAVING RECIPROCATING BLADES

[75] Inventors: Horst Grossmann, Hunfelden; Ernst Staas, Brechen, both of Fed. Rep. of Germany

[73] Assignee: Black & Decker Inc., Newark, Del.

[21] Appl. No.: 115,936

[22] Filed: Oct. 30, 1987

[30] Foreign Application Priority Data

Nov. 11, 1986 [EP] European Pat. Off. ........ 86115651.1

[51] Int. Cl.⁴ ............................................. B27B 19/02
[52] U.S. Cl. ..................................... 30/355; 30/369; 30/392; 83/848
[58] Field of Search ............... 30/166 R, 355, 369, 30/392–394; 83/746, 751, 848, 849, 850, 851

[56] References Cited

U.S. PATENT DOCUMENTS

| | | |
|---|---|---|
| 1,491,134 | 4/1924 | Northall . |
| 1,789,804 | 1/1931 | Broillet ................................. 30/369 |
| 2,784,751 | 3/1957 | Alexander . |
| 2,840,125 | 6/1958 | Kirksey . |
| 2,895,514 | 7/1959 | Wright .................................. 30/374 |
| 4,665,618 | 5/1987 | Leini ..................................... 30/392 |

FOREIGN PATENT DOCUMENTS 332917 11/1958 Switzerland .
2134038 8/1984 United Kingdom ................ 83/746
2158770 11/1985 United Kingdom .

Primary Examiner—Frank T. Yost
Assistant Examiner—Michael D. Folkerts
Attorney, Agent, or Firm—Edward D. Murphy; Dennis A. Dearing; Edward D. C. Bartlett

[57] ABSTRACT

A saw blade, for a power saw having two such blades arranged adjacent and parallel to each other and reciprocating in opposite directions, comprises an elongate blade member having teeth along a bottom edge. The teeth comprise at least three types, a first type being at an outer surface of the blade member, a third type being at the inner surface, and the second type being therebetween. The first type are shaped to produce on the blade's bottom edge an outward force away from the inner surface while cutting a workpiece, and the second and third types are shaped to produce on the blade's bottom edge an inward force, the resultant force on the teeth while cutting urging the teeth in an inward direction away from the outer surface towards the inner surface. When the power saw is operating with a pair of these blades, the blades are urged together at their teeth by the cutting action so effectively eliminating penetration of sawdust and cuttings between the pair of blades. Advantageously the saw blades can be very thin-walled, e.g. 1mm to 2mm thick.

8 Claims, 9 Drawing Sheets

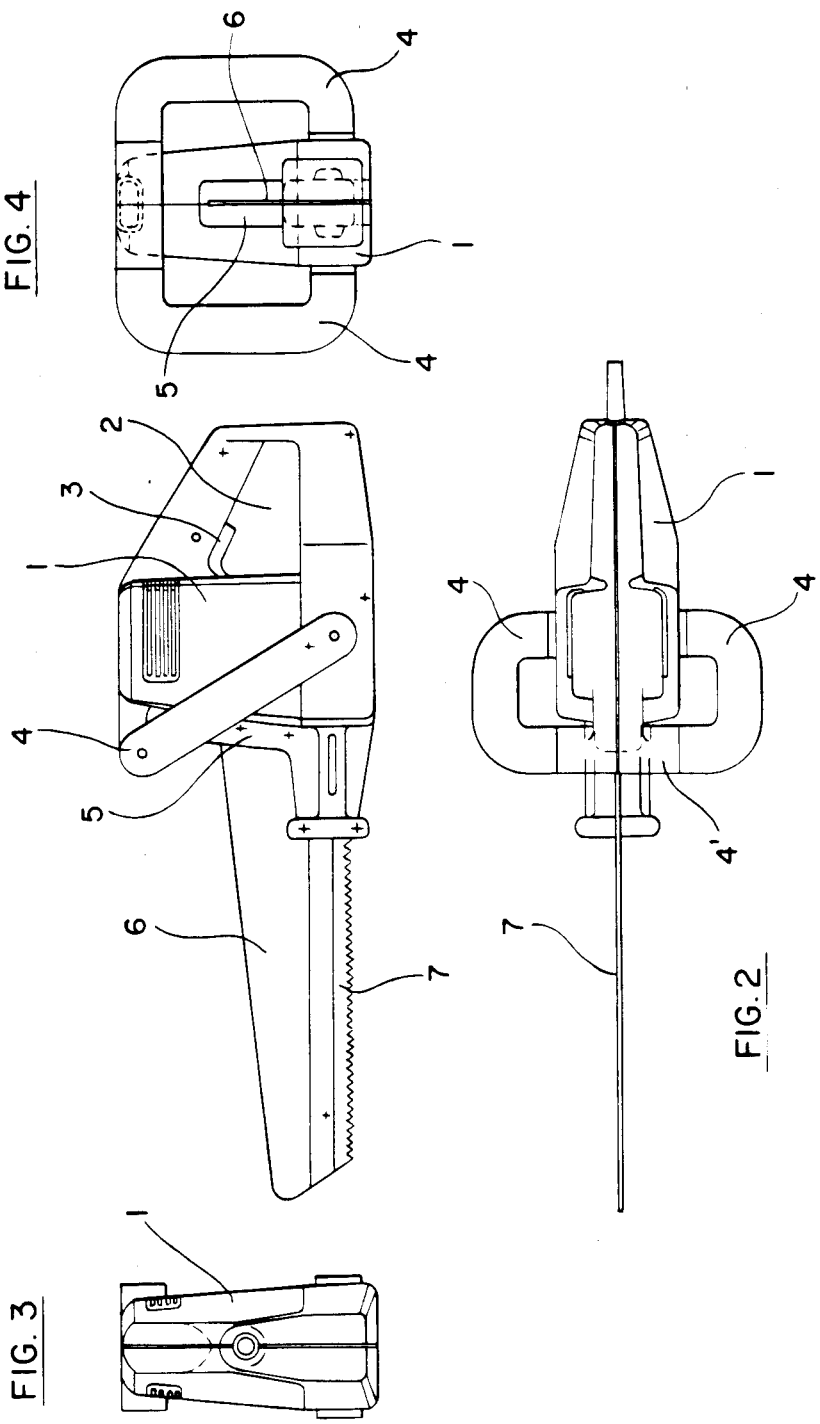

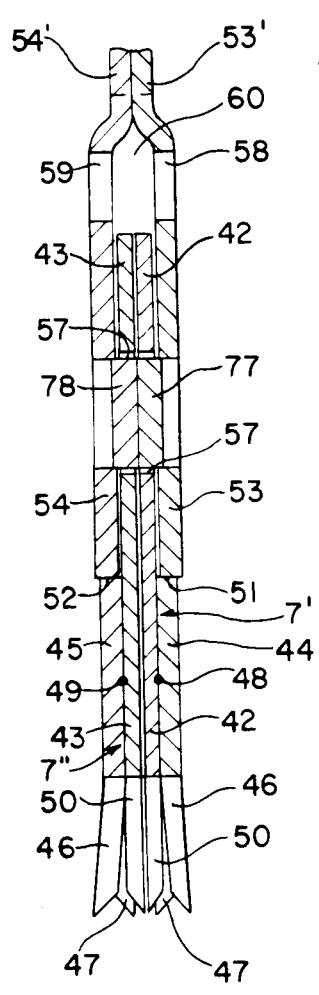
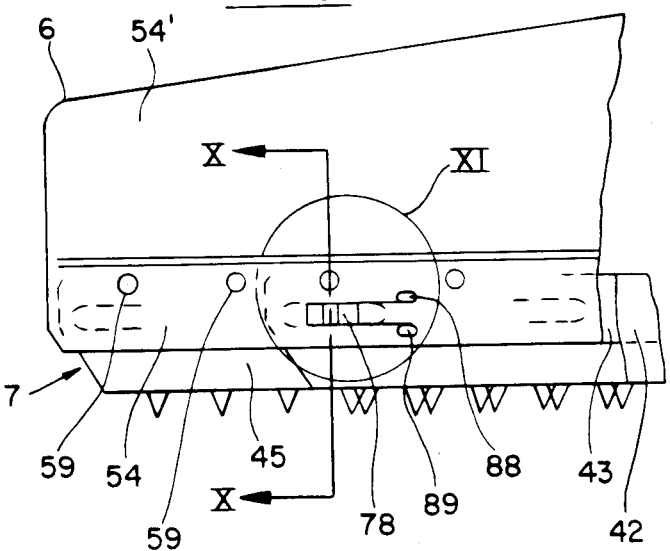
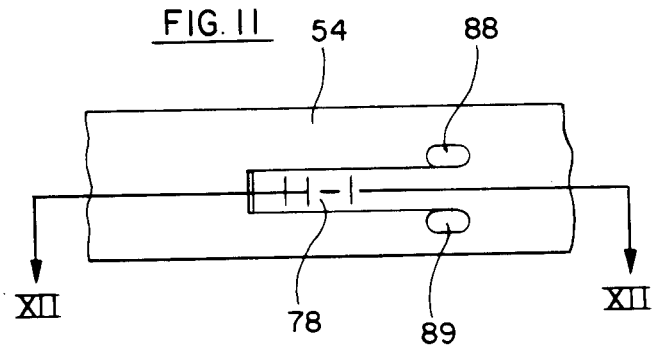
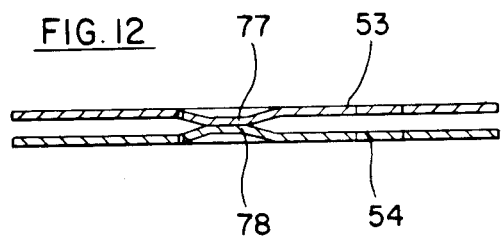

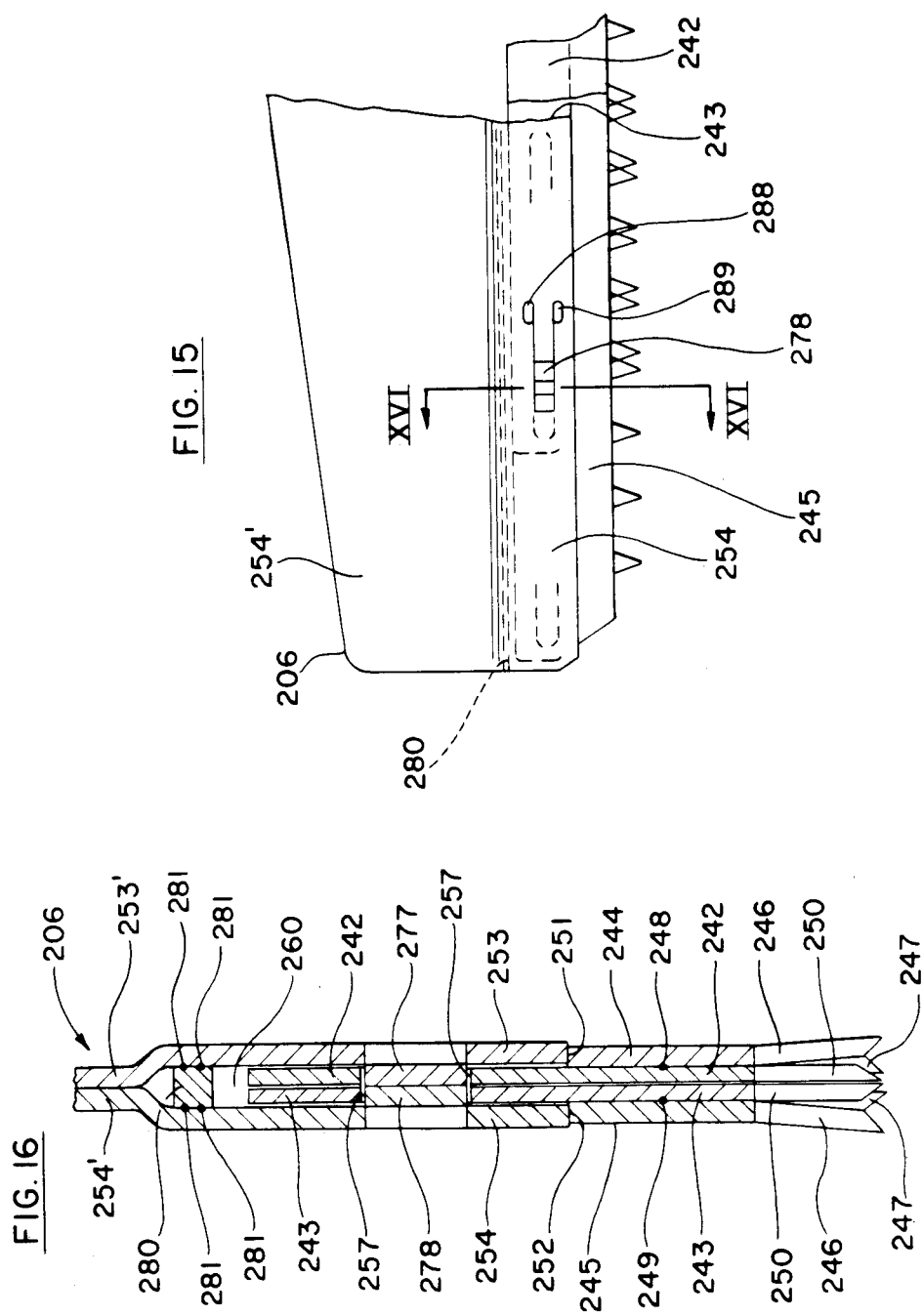

SAW BLADE FOR A SAW HAVING RECIPROCATING BLADES

FIELD OF THE INVENTION

The invention relates to saw blades for power driven saws having two saw blades arranged adjacent and parallel to one another and reciprocating in opposite directions.

BACKGROUND OF THE INVENTION

A saw of this type is disclosed in U.S. Pat. No. 2,840,125 in which a support for the saw blades essentially comprises strip sheet metal bent in U-shaped manner and in which the saw blades are inserted and are secured by means of a screw extending through longitudinal slots therein. The free edges of the U-shaped sheet metal strip serve as a support for longitudinal shoulders on the saw blades. The saw blades are built up in one piece from relatively thick material, and the longitudinal shoulders of the saw blades have substantial width approaching the maximum material thickness of the blades.

SUMMARY OF THE INVENTION

We have realized that the above saw has a disadvantage. On cutting a workpiece, material such as sawdust and chippings can penetrate into the area between the two reciprocating saw blades. This leads to a tendency for the saw blades to separate, which is automatically increased by further material being pushed between them, so that finally the saw may be damaged or at least operation must be interrupted.

We have realized that this difficulty can be reduced by making the saw blades relatively solid and thick, and so more resistive to deformability; also guiding the saw blades within very narrow tolerances may help, so that in operation the saw blades slide with their facing surfaces in fairly closely engaging manner. However, such constructions are rather complicated, heavy and increase the width of the cut being sawn.

The object of this invention is to mitigate one or more of the above disadvantages and provide saw blades which resist the tendency to separate during normal use.

A feature by which this object is achieved is to arrange and shape the saw teeth in order to generate forces during cutting that press the saw blades together in the areas carrying the saw teeth, that is each individual blade is subjected to a resultant force on the teeth in an inward direction.

This has the advantage that very thin-walled saw blades may be used if desired so enabling thinner cuts to be made and making the saw lighter.

Accordingly, therefore, there is provided by the present invention a saw blade comprising an elongate blade member having top and bottom edges connected together by inner and outer side surfaces with three types of teeth formed on the bottom edge. A first type of teeth are located at the outer side surface, a second type of teeth are located at the inner side surface, and a third type of teeth are located between the outer and inner side surfaces. The first type of teeth are shaped to produce on the bottom edge an outward force away from the inner side surface while cutting a workpiece, the second and third types of teeth are shaped to produce on the bottom edge an inward force in a direction away from the outer side surface towards the inner side surface while cutting the workpiece, the resultant force on the blade's bottom edge urging this bottom edge in the inward direction away from the outer side surface toward the inner side surface.

As a result of such a construction, two such cooperating saw blades of the saw are pressed together in operation in the vacinity of the saw teeth, so reducing the risk of sawdust and/or cuttings penetrating between the two saw blades to separate them.

Preferably, the blade member has a longitudinal shoulder formed in the outer side surface, this shoulder facing upwardly away from the saw teeth.

Preferably, the first type of teeth are set outwardly to project outside the outer side surface, the second type of teeth are non-set teeth and are ground outwardly from their cutting edges, and the third type of teeth have roots located further outwards than the roots of the second type, the third type being set inwards but not projecting inwardly beyond the second type of teeth.

When such a saw blade engages with the workpiece, forces act on the first type of saw teeth which favor a separation of the two saw blades, but the forces acting on the second type of saw teeth as a result of the grinding thereof, and the forces acting on the third type of saw teeth as a result of the setting thereof, cause a pressing together of the two saw blades. This pressing together can additionally be effected by the reaction force on the longitudinal shoulder of the saw blade, provided such reaction force is arranged to be outward of the central plane of the blade.

Preferably, the roots of the saw teeth of the first and third types are located further outwards than the longitudinal plane through the saw blade at the inner side of the longitudinal shoulder. It is also advantageous if the width of the longitudinal shoulder does not exceed half the maximum thickness of the saw blade, because then the reaction force on the shoulder acts relatively far out on the saw blade, and consequently effectively assists the production of a strong inward torque on the bottom of the saw blade.

In order to achieve a very simple construction of the saw blades permitting inexpensive manufacture, the longitudinal shoulder of each saw blade can be formed by an outer section carrying saw teeth and which is superimposed on and connected, preferably by welding, to an inner main section also carrying teeth. This main section projects upwardly beyond the outer section, the longitudinal shoulder being formed by an upper edge of the outer section. Such a saw blade can therefore comprise two parts manufactured very simply from strip material and can have a maximum thickness as thin as 1 mm to 2 mm.

In order to be able to easily remove from the area of the saw teeth the sawdust produced in operation, the above outer section can be provided with grooves which are open at both ends and extend from the saw teeth to the longitudinal shoulder, or can be interrupted by such grooves. As a result of these grooves, the cut material can be very easily removed from the area of the saw teeth.

Preferably the saw blade is made from hardened spring steel.

Other objects, features and advantages of the present invention will become more fully apparent from the following detailed description of the preferred embodiment, the appended claims and the accompanying drawings.

BRIEF DESCRIPTION OF THE DRAWINGS

In the accompanying drawings, in which the same reference characters in different Figures indicate like parts:

FIG. 1 is a side view of a powered tool according to the invention in the form of an electrically driven, portable saw;

FIG. 2 is a plan view of the saw of FIG. 1;

FIG. 3 is a rear end view of the saw of FIG. 1 from the right in FIG. 1, the support handles being removed;

FIG. 4 is a front end view of the saw of FIG. 1 from the left in FIG. 1;

FIG. 9 is a partial view of the front portion of the support plate of FIG. 8 with inserted saw blades;

FIG. 10 is a section along a lower part of the line X—X of FIG. 9.

FIG. 11 is a fragmentary view, on a larger scale of a detail in circle XI in FIG. 9;

FIG. 12 is a partial section along the line XII—XII of FIG. 11, the saw blades being omitted;

FIG. 15 is a partial side view similar to FIG. 9 of a modified support plate with inserted blades according to the invention; and FIG. 16 is a section along the line XVI—XVI of FIG. 15.

DETAILED DESCRIPTION OF THE PREFERRED EMBODIMENTS

Figure 5:
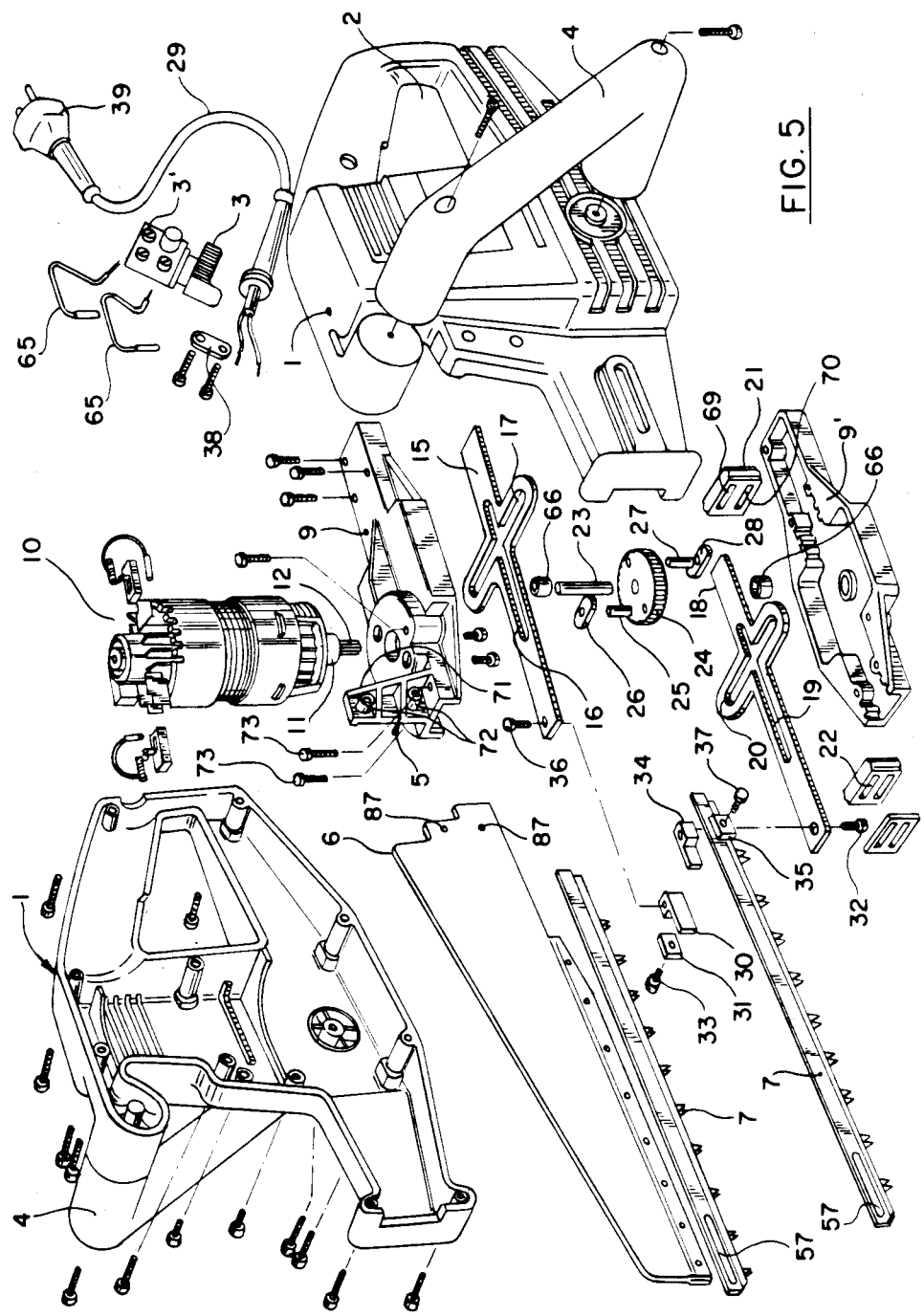
FIG. 5 is an exploded view of the saw of FIGS. 1 to 4 with some parts omitted and others simplified for clarity.

The saw shown in FIGS. 1 to 4 has a housing 1 built up in the conventional manner from half-shells and which houses an electric motor 10 (but optionally an internal combustion motor could be employed), a gear arrangement and cutting blade holders 15 and 18. On the rear part of housing 1 is provided a handle opening 2 into which extends in the conventional way a manually operated trigger element 3 of an on-off switch 3' (see FIG. 5). On the front part of housing 1 is provided a diagrammatically indicated mounting arrangement 5 for fitting a support plate 6. This support plate 6 supportingly engages around the upper areas of a pair of oppositely reciprocating saw blades 7. Lateral support handles 4 extend from housing 1 between the rear handle opening 2 and the support plate 6. The two lateral handles 4 are individually detachable to temporarily reduce the overall width dimension of the whole saw on either or both sides to enable closer cuts to be made, e.g. when sawing a branch from a tree. This can be accomplished by simply removing two screws retaining either handle 4, as can be appreciated from the right-hand side of FIG. 5. When both handles 4 are so removed, a spacing handle portion 4' (see FIG. 2), to which the upper leg of each handle 4 is attachable, serves as a temporary forward handle.

As can be gathered from FIG. 5, an electric lead 29 with plug 39 is fixed to the rear handle part of housing 1 by a tension relief plate 38. Two short cable sections 65 with terminals are used for producing an electrical connection from the on-off switch 3' to the electric motor 10. The motor 10, housed in housing 1 and on whose armature shaft 11 is located a fan wheel 13 (see FIG. 6), is mounted in tower construction manner upright on an upper, metallic partial housing 9 of the gear arrangement. The lower and outer end of the armature shaft is formed as a pinion 12 and extends downwardly through partial housing 9 and projects through longitudinal slots 16 and 19 of the cutting blade holder 15, 18. The lower end of the armature shaft 11 is mounted in a bearing 14 (see FIG. 6) in a lower, metallic partial housing 9'.

As can in particular be gathered from FIG. 5, the cutting blade holders 15, 18 have a cross-like configuration and, in addition to the longitudinal slots 16, 19, have guidance slots 17, 20 at right angles thereto. It can be seen that the longitudinal slots 16, 19 are not separated by a web from the guidance slots 17, 20. Thus, when the cutting blade holders 15, 18 are longitudinally displaced, the armature shaft 11 passes out of an area of the longitudinal slots 16, 19, through the area of guidance slots 17, 20, and then into the opposite, other area of longitudinal slots 16, 19.

Parallel to the armature shaft 11, in an area closer to handle opening 2, a bearing spindle 23 extends through the partial housing 9. The spindle 23 is rotatably mounted at both ends in bearing bushes 66 in partial housing 9, 9', and has non-rotatably secured thereon a gear 24, the latter meshing with pinion 12.

The gear 24 is located between the two cutting blade holders 15, 18 and its bearing spindle 23 extends in the same way as armature shaft 11 through longitudinal slots 16, 19. The length of these slots 16, 19 is selected in such a way that, in a manner to be described hereinafter, the cutting blade holders 15, 18 reciprocate over their entire travel, in the drawing planes of FIGS. 6 and 7, in the direction of the longitudinal extension or axis of each holder. On radially opposite sides of the gear 24 are fitted eccentric pins 25, 27, on whose outer ends are rotatably mounted sliding pieces 26, 28. In the normal use position of the saw shown in FIGS. 1 and 6, sliding piece 26 is positioned above the gear 24 and sliding piece 28 below gear 24. Sliding piece 26 engages in the transverse guide slot 17 of the upper cutting blade holder 15, and sliding piece 28 in the guide slot 20 of the lower cutting blade holder 18. Therefore, the distance between the two cutting blade holders 15, 18 is only about the thickness of the gear 24.

The length of each sliding piece 26, 28 corresponds to at least twice the width of the longitudinal slot 16, 19 plus the diameter of the associated eccentric pin. This ensures that each sliding piece 26, 28 is reliably guided in any position in the associated guidance slot 17, 20 and does not tilt towards the longitudinal extend of the respective longitudinal slot 16, 19 in the transition region where the slots intersect.

The eccentric pins 25, 27 are located on a diagonal through the central axis of gear 24 and have the same radial spacing from the bearing spindle 23.

The cutting blade holders 15, 18 are supported by two bearing blocks 21, 22 each having two parallel slots 69, 79 separated by a web. The height and width of slots 69, 70 is chosen in such a way that each elongated, cross-sectionally substantially rectangular cutting blade holder 15, 18 passes through the same with a slight clearance, so that there is a good longitudinal guidance for the holders 15, 18. The bearing blocks 21, 22 are inserted respectively on the rear and front ends of the partial housing 9, 9', and are secured by dovetail guides or similar guidance grooves which prevent tilting of said bearing blocks 21, 22 during reciprocation of the blades 7.

Figure 6:
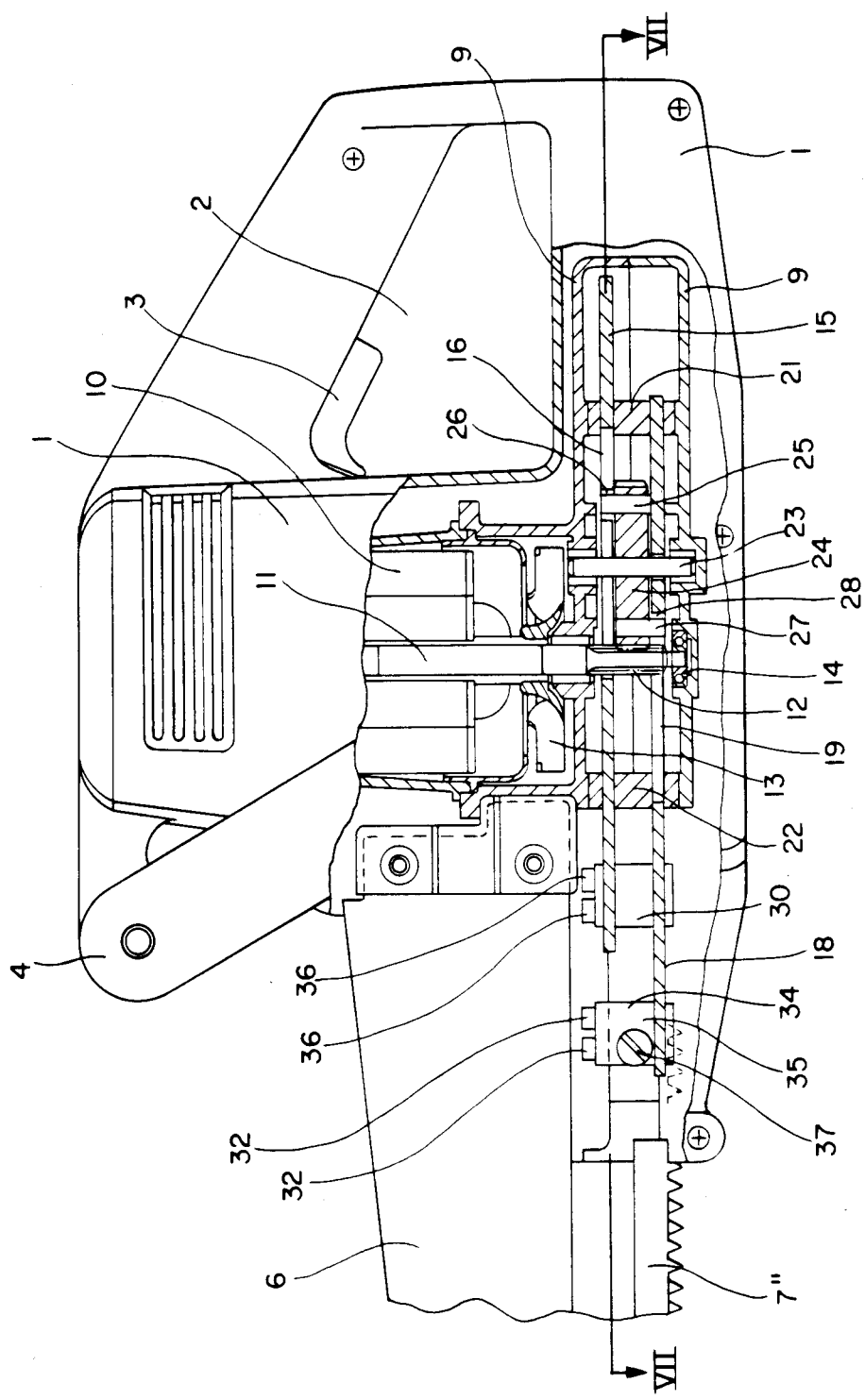
FIG. 6 is a partial side view on a larger scale of the saw of FIG. 1, partly broken away and partly in section to show the motor, gearing and cutting blade holders.
Figure 7:
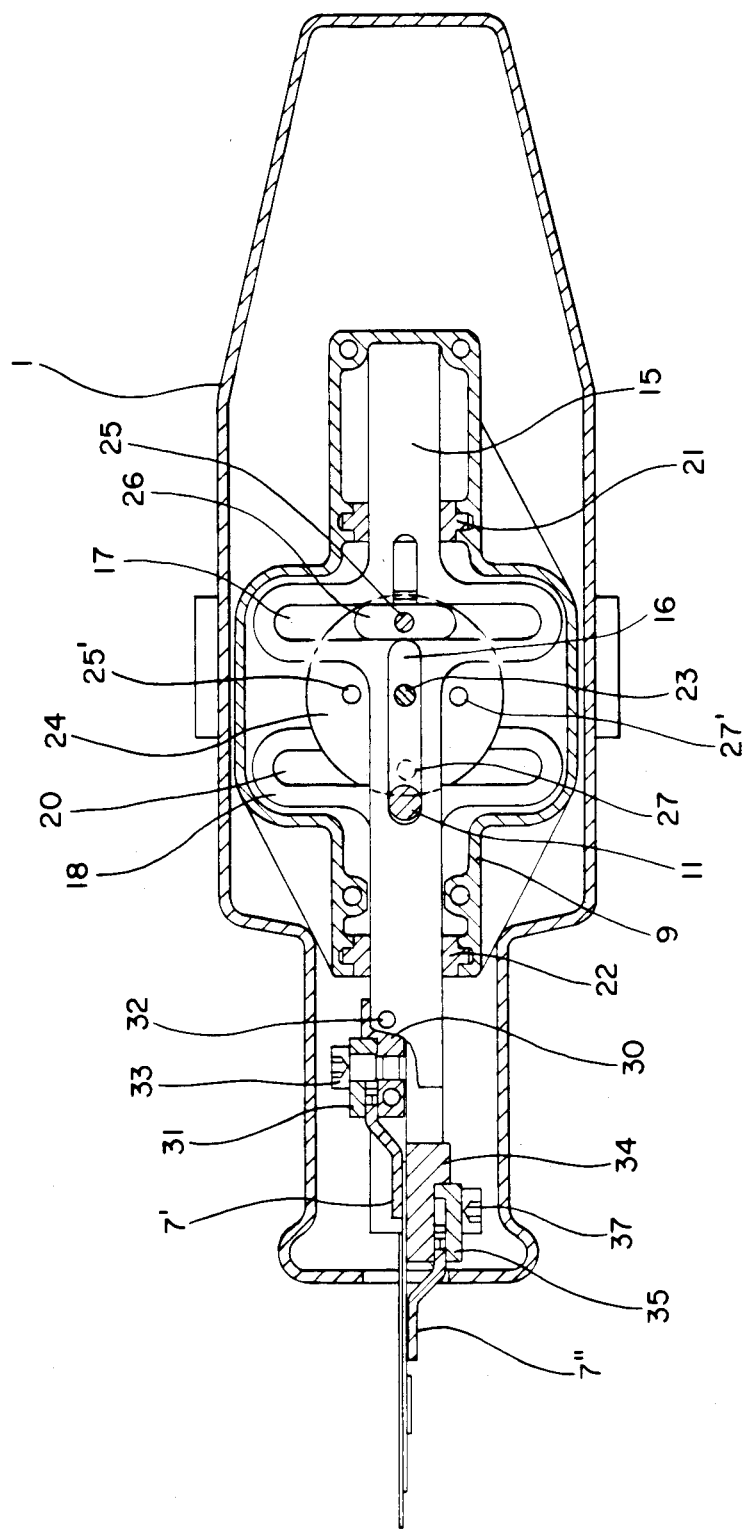
FIG. 7 is a section along the one VII—VII of FIG. 6.

On the ends of the cutting blade holders 15, 18 projecting forwardly out of the partial housing 9, 9', and located to the left in FIGS. 6 and 7, are mounted cutting blade fixtures in the form of clamps. These clamps comprise clamping blocks 30, 34 fixed by means of screws 32, 36 to the cutting blade holders, and clamping pieces 31, 35 pressible towards opposite sides of the holders 15, 18 by a single clamping bolt 33 or 37. As shown in FIG. 7, between the clamping block 30 and clamping piece 31 is secured an offset end of the right-hand saw blade 7'. Correspondingly, the rear end of the offset portion of the left-hand saw blade 7" is secured between clamping block 34 and clamping piece 35. The saw blade shafts are secured to these outwardly offset ends, for example by welding, and the cutting blade portions of the saw blades are thus located immediately adjacent to one another. FIG. 6 shows a preferred arrangement of the screws 32 and 36, this being modified from the arrangement in FIG. 5.

When the armature shaft 11 is driven by motor 10, it rotates gear 24 via the pinion 12, so that eccentric pins 25, 27 perform a rotary movement about the central axis of bearing spindle 23. As a result of this rotary movement, there is a corresponding displacement of sliding pieces 26, 28 which oscillate backwards and forwards in guidance slots 17, 20. Due to the rotary movement of the gear 24, the sliding pieces 26, 28 reciprocate the associated cutting blade holders 15, 18 in the direction of the longitudinal extension or axis of the holder. If, in this connection, it is assumed that the movement starts from the position according to FIG. 7, then on rotation of the gear 24 the cutting blade holder 15 is displaced to the left from its outer right-hand position in FIG. 7, and the cutting blade holder 18 is displaced to the right from its outer left-hand position in FIG. 7, i.e. cutting blade holders 15 and 18 are oppositely reciprocated. The travel or stroke of the two cutting blade holders is the same, because the spacing of the associated eccentric pins 25, 27 from the bearing spindle 23 of gear 24 is the same.

During the oscillation of sliding pieces 26, 28 in guidance slots 17, 20, the sliding pieces cross over the longitudinal slots 16, 19 without this impairing the movement of the sliding pieces. This is because, as a result of their dimensions, the sliding pieces are always reliably guided in guidance slots 17, 20 and cannot tilt in the crossing region with the longitudinal slots 16, 19.

As indicated in FIG. 7, additional pairs of bores 25', 27' can be provided in the gear 24. These bores 25', 27' are located closer to the bearing spindle 23 than the eccentric pins 25, 27, but have in each case the same spacing from bearing spindle 23. Thus, if eccentric pins 25, 27 are inserted in bores 25', 27', with an otherwise substantially identical construction of the saw, there will be a smaller travel or stroke of the cutting blade holders 15 and 18. This enables the saw to be converted to a shorter reciprocating stroke of the cutting blades 7 if desired.

The plate-like support plate 6, whose construction will be described hereinafter, is fixed to an upward projection 5 (see FIG. 5) by means of holes 87 provided on its rear mounting end. Projection 5 is formed on the front end of partial housing part 9 and has a rear reinforcing rib 71. Formed-on or mounted screw bushes 72, for receiving clamping bolts 73, extend through a vertical wall of the projection 5, and these bolts extend through the mounting holes 87 of support plate 6.

The construction of the support plate 6 and the saw blades 7, as well as their interaction, can best be seen from FIGS. 8 to 12.

As shown, support plate 6, which at its end having the mounting holes 87 is higher than at the opposite end (see FIG. 8), comprises two individual, shaped plates 53', 54' (FIG. 10), which are interconnected by spot welding. This leads to a high stability against twisting and bending. Plates 53', 54' can be made from steel or aluminum and so cause good heat dissipation from the cutting blades. In the lower region, plates 53', 54' are outwardly stepped so as to form parallel support sections 53, 54 with an intermediate cavity formed therebetween. This cavity accommodates the upper regions of the two saw blades 7', 7".

As can in particular be gathered from FIG. 10, the saw blades in each case comprise a main inner section 42, 43 and a separate reduced height outer section 44, 45 which, as indicated at 48 or 49, are connected by spot welding. The upper edge of reduced height section 44 or 45 of the unit constituted by section 44 or 45 and main section 42 or 43 forms a longitudinal shoulder 51 or 52. In operation, the shoulders 51, 52 are supported on, and slide along, the lower edges of the support sections 53, 54 (see FIG. 10), respectively. Whereas, as can also be gathered from FIG. 10, the upper edges of the main sections 42, 43 terminate below the stepped portions at the upper end of support sections 53, 54, so that a free space 60 is formed above the main sections 42, 43. This ensures that the main sections 42, 43 are not supported or contacted on their upper edges.

On the lower edges of sections 44, 45 are formed saw teeth 46, 47. The saw teeth 46 are set outwardly, so that they project beyond the outer face of the associated blade section 44, 45, and consequently produce a cut in the workpiece which is wider than the maximum material thickness of the two saw blades. The saw teeth 47 on sections 44 and 45 are set inwardly, so that they extend into the area below the associated main section 42, 43. On the main sections 42, 43 are located non-set saw teeth 50 ground in upwardly and outwardly sloping manner from their lower edges.

Adjacent their forward ends, the saw blades have longitudinal slots 57 (FIG. 5) running parallel to the longitudinal shoulders 51, 52 and the end regions of these slots 57 are indicated in broken line form in FIG. 9. Leaf spring strips 77, 78 (FIGS. 9 to 12), constructed in a manner to be described hereinafter on support plate 6, extend into these longitudinal slots. The saw blades 7 are guided at the front area of the support sections 53, 54 in longitudinally reciprocatable manner by and between the leaf spring strips 77, 78. These leaf spring strips 77, 78 also prevent the release of the saw blades from the support plates 6. The rear ends of the saw blades are fixed to the cutting blade holders 15, 18 in the manner described hereinbefore.

In operation, when the saw teeth 46, 47, 50 of the saw blades engage with a workpiece, so forcing the saw blades towards the support plate 6, displacement of the saw blades into the support plate 6 is prevented by the longitudinal shoulders 51, 52 of the saw blades. The support sections 53, 54 exert a downward supporting force on these longitudinal shoulders. These forces exerted downwards on the longitudinal shoulders 51, 52, particularly if as shown, each outside section 44, 45 and each inner main section 42, 43 have the same thickness or sections 44, 45 are less thick than the main sections 42, 43, lead to a torque which presses together the saw blades in their lower region carrying the saw teeth, so that the non-set saw teeth 50 are pressed against one another. Moreover, an upwardly and outwardly directed force acts on the outwardly set saw teeth 46 due to the engagement with the workpiece, particularly as the saw teeth 46 are also ground in outwardly inclined manner from top to bottom. This latter force acts in the manner of forcing apart the saw blades in the vicinity of saw teeth 50. However, saw teeth 47 are set inwards and have ground edge sloping from top to bottom and also inwards, so that an upwardly and inwardly acting force occurs thereon which counteracts the separating force for the saw blades through saw teeth 46. A corresponding force also acts on saw teeth 50 which, as a result of the grinding thereof inclined outwardly and upwardly from the inside, act upwardly and inwardly.

The shape and positioning of the saw teeth 46, 47, 50 are matched so that a torque is produced on the two saw blades in the vicinity of saw teeth 50 through the forces acting on saw teeth 46, 47, 50 and by the supporting forces acting on longitudinal shoulders 51, 52. The torque pressed together the saw blades in this area, so that saw teeth 50 and the area of the main sections 42, 43 adjacent to the teeth 50 are firmly pressed together in operation, even without maintaining close tolerances. Consequently, the risk of the saw blades being separated by material penetrating between them is effectively eliminated.

As has already been stated, by means of the leaf spring strips 77, 78, the saw blades are held between the support sections 53, 54 of support plate 6. These leaf spring strips are cut out of the walls of support sections 53, 54 by punching or stamping, so that the strips 77, 78 are only connected by their right-hand ends in FIGS. 9, 11 and 12 with the wall of the particular support sections 53, 54. Adjacent to the connection of these strips, and for reducing any notch effect, openings 88, 89 are formed in the supports sections 53, 54 above and below each strip and on the forward side of the respective connection. During the punching operation, the leaf spring strips 77, 78 are deformed in such a way that their central regions curve inwards and are concavely shaped, as can be seen in FIG. 12, so that the strips are urged against each other and there is reciprocal support thereof. They can consequently be forced apart by the insertion longitudinally of the main sections 42, 43 of the saw blades between support sections 53, 54, and the saw blades can be so positioned that their slots 57 are located in the vicinity of the leaf spring strips 77, 78, the latter then snapping into the slots 57 to secure the saw blades against vertical displacements (FIG. 10). It will be noticed that the forward and rear portions of each strip 77, 78 flare outwardly away from each other to facilitate insertion (and removal) of the blades.

As the leaf spring strips 77, 78 are produced during the stamping operation by cutting in, i.e. without any material removal, their upper and lower edges in operation are supported on the resulting boundary upper and lower edges of the slots so formed in the walls of supports sections 53, 54. Thus, in operation there can be no vertical displacement (FIG. 10) of strips 77, 78 i.e. they provide a high stability for the supporting of the forward portions of the saw blades.

For removing the saw blades, the user has to loosen them from the cutting blades holders 15, 18 and then displace the saw blades in such a way that the leaf spring strips 77, 78 are resiliently displaced outwardly and are forced out of the slots 57 in main sections 42, 43 of the saw blades. The saw blades can then be slid out from between the support sections 53, 54.

Figure 8:
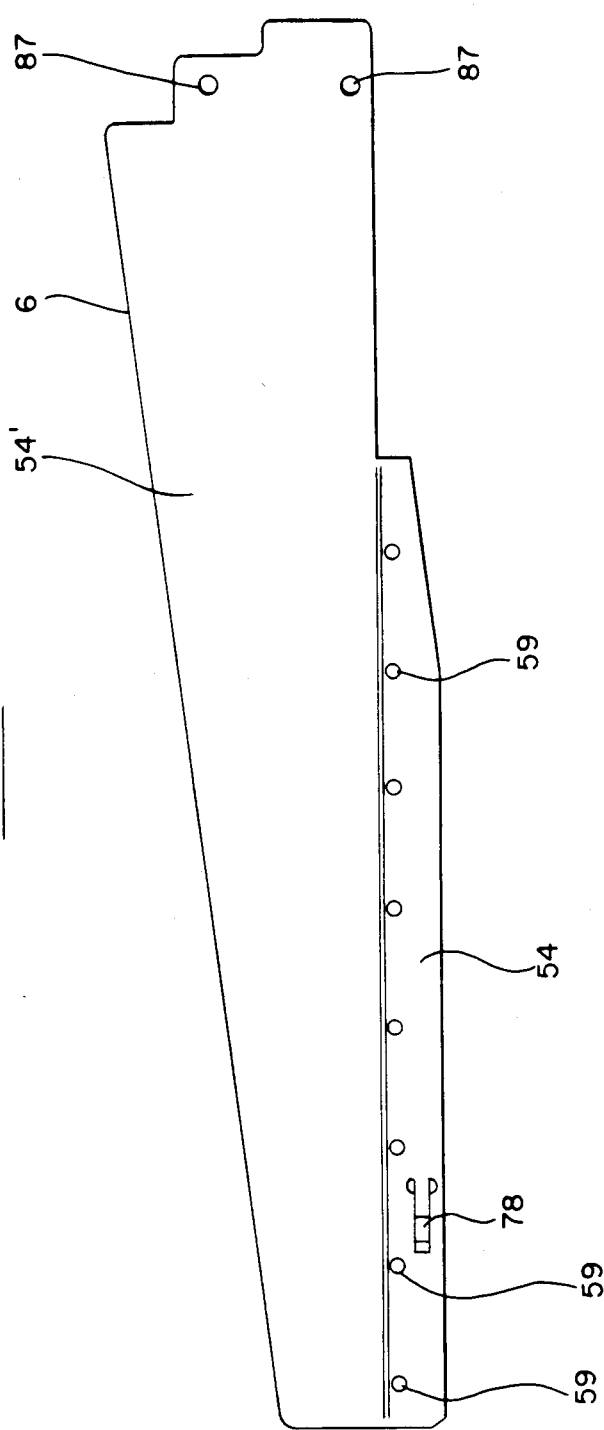
FIG. 8 is a side view of the support plate of the saw of FIGS. 1 to 7.

As can be gathered from FIGS. 8 to 10, openings 58, 59, in the form of through bores, are provided in support sections 53, 54 above the upper edges of the main sections 42, 43 of the saw blades. The openings 58, 59 effect communication of the free space 60 (FIG. 10) with the outside of the support sections 53, 54. These openings permit the discharge of cut material, which in operation may enter between the support sections 53, 54 and the blades, and could lead to operational problems if allowed to collect in the space 60.

Figure 13:
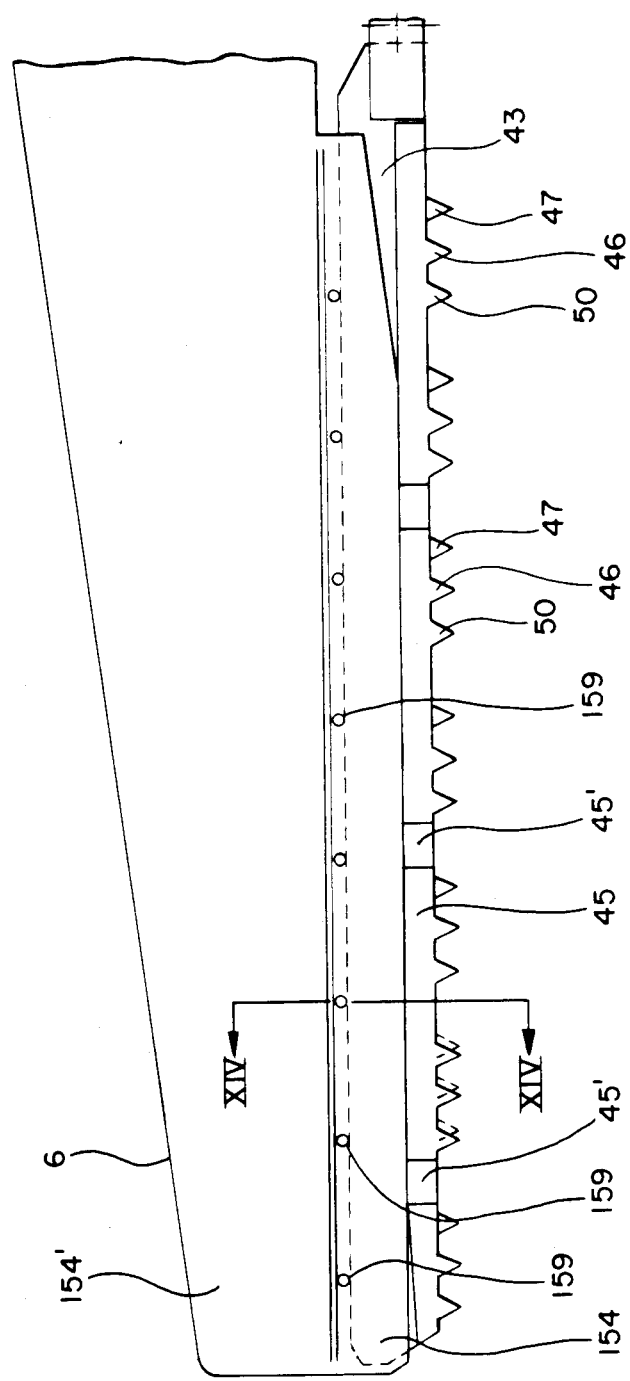
FIG. 13 is a partial side view of another support plate with inserted saw blades according to the invention.
Figure 14:
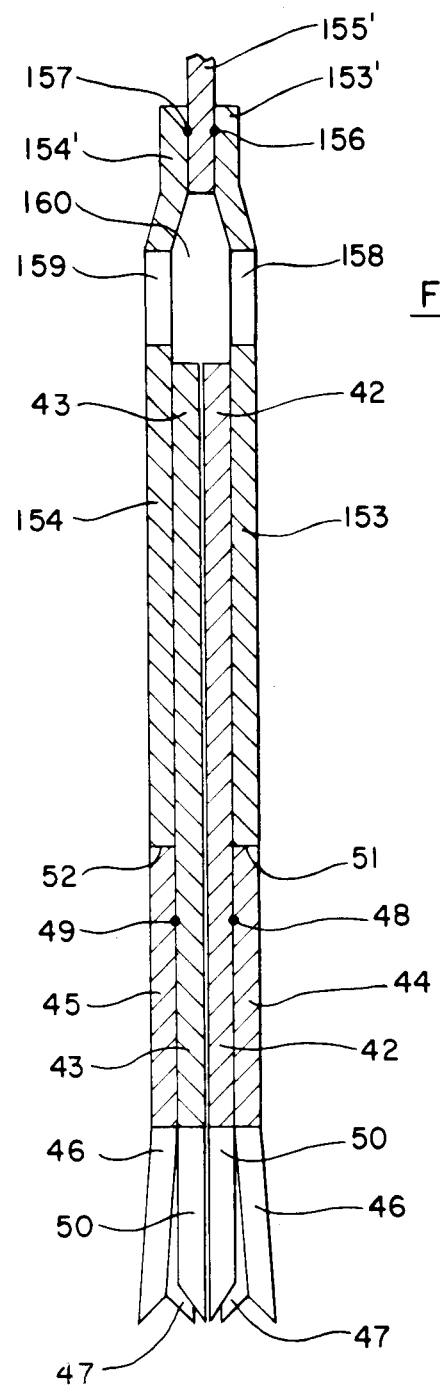
FIG. 14 is a lower part of the section along the line XIV—XIV of FIG. 13.

FIGS. 13 and 14 show a support plate which is somewhat modified compared with that of FIGS. 8 to 12, and in which modified saw blades are inserted. The same parts as those in FIGS. 8 to 12 are given the same references in FIGS. 13 and 14 and corresponding parts generally have their reference numerals increased by 100.

It should be noted that FIG. 13 does not show the leaf spring strip for securing the adjacent saw blade. It is pointed out in this connection that it is possible to choose a different type of retaining mounting of the saw blades in the front region of the support plate. For example, it would be possible to provide a rivet extending through the support sections 153, 154 and the reception space located between them; in their main section 42, 43 the saw blades could then each have a forwardly open slot to permit the insertion of the saw blades over the rivets.

The support plate according to FIGS. 13 and 14 comprises three partial plates 153', 155' and 154' which, as indicated at 156 and 157, are joined by spot welding. The central plate 155' does not extend down to the bottom edge of the support plate, but ends where the two outer plates 153' and 154' are outwardly displaced, or stepped apart, so as to form the spaced-apart support sections 153, 154. The saw blades, that is their main sections 42, 43, are inserted in the cavity so formed between the support sections 153, 154.

The free space 160 above main sections 42, 43 is once again connected by cross-bores 158,159 to the outside of support sections 153, 154, so that cut material can be removed out of the free space 160 through these bores 158, 159. The cross-bores 158, 159 (and also the cross-bores 58,59) are preferably aligned in pairs 158, 159.

To aid removal of cut material from the saw teeth, it is possible to provide in sections 44, 45 grooves or channels 45' (FIG. 13) extending from the saw teeth to the longitudinal shoulders 51, 52, this enabling the cut material to be removed upwards on the outside of the blades. These grooves can, for example, be created by forming the blade outer sections 44, 45 from a plurality of partial lengthwise sections attached to the main and inner blade sections 42, 43 in spaced apart relationship; in this way the grooves 45' are formed between these longitudinally spaced apart partial sections.

When manufacturing a support plate as shown in FIGS. 8 to 10, it can be difficult to bend outwardly and form outwardly directed steps in the two plates, forming the supporting sections 53, 54, with close tolerances so that a predetermined width of the cavity between the supporting sections 53, 54 is obtained. Such close tolerances are desirable for closely enclosing the upper parts of the saw blades between support sections 53, 54. Further, rigidity of a support plate 6 comprising two individual plates 53', 54' as shown in FIGS. 8 to 10 can be insufficient for certain uses. However, the use of individual stepped plates 53', 54' (or 153', 154' in FIG. 14) is advantageous to reduce the weight of the support plate 6, and so therefore the weight of the saw. These stepped plates can be made of relatively thin steel or aluminum plate so that the combined thickness of the two plates is substantially less than using a single thick plate and machining a blade cavity therein. Due to the steps in the two individual plates, the combined thickness of the two plates can be of the order of the combined thickness of the main and inner portions 42, 43 of the saw blades 7, see, for example, the upper portion of FIG. 10. This is because the steps at the top of the support sections 44, 45 enable an adequate blade containing cavity to be defined and also provide strengthening reinforcement of these thin plates.

To improve the rigidity of the support plate 6, a steel bar or strip 280 may be incorporated as shown in FIGS. 15 and 16 in which the same parts as in FIGS. 9 and 10 are given reference numerals increased by 200 over the reference numerals used in FIGS. 9 and 10.

As can be recognized, particularly from FIG. 16, the steel bar 280 is rectangular in cross-section and is located between the support sections 253, 254 formed by the outwardly bent and stepped lower parts of the two individual plates 253', 254' constituting the support plate 206. The steel bar 280 is located above the upper edges of the main sections 242, 243 of the saw blades so that a free space 260 is provided between such upper edges and the steel bar 280. Therefore, the saw blades are supported by the lower edges of the supporting sections 253, 254 which are in engagement with the longitudinal shoulders 251, 252 of the outer sections 244, 245 of the saw blades.

The steel bar 280 is located just beneath the bent transitional area of the plates 253' and 254', that is just below the outward steps, and is connected to the support sections 253, 254 by spot welding as indicated at 281. Thereby, the width of the cavity (which is also the width of the free space 60 at the top of the cavity) between the support sections 253 and 254 is exactly defined by the width of the steel bar 280; any inaccuracies occuring during the bending action (to form the steps) are automatically compensated or removed. Further, the lowermost connection area of support sections 253, 254 has been moved nearer to the saw blades compared to the structure of FIGS. 8 to 10. Since, the saw blades transmit forces against the support sections 253, 254, the rigidity of support plate 206 is considerably increased by locating this lowermost connection area nearer to the saw blades.

It should be noted that in the embodiment of FIGS. 15 and 16 through-bores for removal of cut material from the open space 260, i.e. through-bores corresponding to the bores 58, 59 in FIGS. 8 to 10, are omitted. However, such through-bores can, of course, be also provided in the embodiment of FIGS. 15 and 16 below the bar 280.

It will be appreciated from the foregoing that a versatile saw, particularly useful for cutting and logging trees, is provided which has an improved cutting action and also has a lighter-weight yet robust saw blade and support plate assembly. As will be realized, both the construction of the saw blade and the support plate, contribute to this improvement.

The saw blades are each formed from two separate and toothed blade sections, preferably spot wielded together. Each blade is thin, and is of low height relative to its length and to the height of the support plate. This, together with the formation of the support plate including two individual stepped plates, again preferably spot welded together, enables a reduction in weight of the assembly of the support plate and saw blades while still providing sufficient rigidity for this assembly. The saw blades in this assembly may each be as thin as 1 mm to 2 mm, and the moment of resistance against bending of the composite support plate may be in the range of 7.5 to 30 times that of each saw blade. Preferably, the resistance to sideways bending of the support plate is 10 to 25 times that of each saw blade.

Each saw blade has teeth comprising three different types, inside, intermediate and outside teeth. These different teeth, respectively 50, 47 and 46, are so shaped that the resultant force on these teeth from the wood when cutting is directed inwards towards the other saw blade, so contributing to the two blades not separating laterally at the teeth when cutting. This is important, since lateral separation of the cutting edges of the two blades in operation would allow wood cuttings, e.g. sawdust, to penetrate between the blades so gradually forcing the bottom cutting edges of the blades apart; this would result in a wider and less clean cut being made and also would tend to damage the blades—eventually with jamming of the blades in the support plate. In the teeth arrangements shown, the outside tooth 46 determines the width of the cut but has a force exerted on it tending to separate the saw blades; however, the intermediate tooth 47 and the inside tooth 50 are both oppositely inclined in grinding to the outside tooth 46 and so have two forces exerted on them which are both in a direction tending to force the saw blades together. Thus, the resultant force on the three teeth 50, 47, 46 is in an inward direction forcing the cutting edges of the two blades together. As shown in FIG. 13, preferably the different teeth are grouped together along the length of each saw blade with a tooth 46 in the middle of each group and a tooth 50 and a tooth 47 on each side thereof.

An important feature of forcing the two saw blades together has been found to be the arrangement of the relative width and positioning of the shoulder 51, 52 on each blade to enable this to produce a strong torque on each blade tending to force together the cutting edges of the blades. In this respect it is important to have a free space, such as space 60, above the inner and main section 42, 43 of the blades; this prevents any downward force or pressure on the upper edges of the blades. Also, the outwardly positioned shoulders 51, 52 have a lateral width approximately equal to or less than half the maximum thickness, or lateral width, of the saw blade, and the lower edges of the individual plates 53, 54 of the support plate 6 contact these shoulders 51, 52 over the entire lateral width of the shoulders. This provides in operation a resultant reaction force of each individual plate 53, 54 on the associated shoulder 51, 52, which force is downward and parallel to the heightwise direction of the blade, but is offset outwardly of the central plane of the blade by at least half the lateral thickness of the shoulder 51, 52. As the shoulder has a width not larger than half the maximum thickness of the saw blade, this resultant downward force is located at least halfway between the central plane of the blade and the outside plane of the blade; thus, this resultant force produces a torque on the blade tending to rotate the cutting edge of the blade inwardly towards the other blade. Due to the above location of the resultant force being substantially displaced from the center plane of the blade, a strong torque is exhibited on both blades firmly pressing their teeth together during cutting operations.

The above described embodiments, of course, are not to be construed as limiting the breadth of the present invention. Modifications, and other alternative constructions, will be apparent which are within the spirit and scope of the invention as defined in the appended claims.

What is claimed is:

1. A saw blade for a power saw having two such blades arranged adjacent and parallel to each other and reciprocating in opposite directions, said saw blade comprising;

an elongate blade member extending in a longitudinal direction and having a top edge, saw teeth along a bottom edge, an outside surface extending between said top and bottom edges on one side of said blade member, and an inside surface extending between said top and bottom edges on an opposite side of said blade member;

said outside surface being formed with a longitudinal shoulder partway between said top and bottom edges and extending in said longitudinal direction, said shoulder facing upwardly away from said bottom edge;

said teeth comprising first, second and third types of teeth;

said first type of teeth being located at said outside surface and being set outwardly to project beyond said outside surface;

said second type of teeth comprising non-set teeth located at said inside surface and being ground from bottoms thereof upwardly and outwardly with respect to said blade member;

said third type of teeth having upper roots located further outwardly towards said outside surface than roots of the second type of teeth, said third type of teeth being set inwardly but not projecting beyond the teeth of said second type; and the three types of teeth cooperating when cutting a workpiece to bias said bottom edge to move in a direction from said outside surface towards said inside surface, the first type of teeth being subjected to forces acting outwardly away from said inside surface and the second and third types of teeth being subjected to forces acting inwardly towards said inside surface to produce a resultant force acting on all three types of teeth which is directed inwardly towards said inside surface.

2. The saw blade of claim 1, wherein said third type of teeth are ground from bottoms thereof only upwardly and outwardly with respect to the blade member.

3. The saw blade of claim 1, wherein roots of said first type of teeth and the roots of said third type of teeth are located between said outside surface and a longitudinal plane parallel thereto through said blade member at an inner junction between said longitudinal shoulder and said blade member.

4. The saw blade of claim 3, wherein said blade member comprises two discrete and superimposed plates, one plate forming an inside main section and extending from said bottom edge to said top edge, the other plate forming an outside section extending from said bottom edge only partway towards said top edge, an upper edge of said other plate forming said longitudinal shoulder, said first and third type of teeth being formed on said other plate, and said second type of teeth being formed on said one plate.

5. The saw blade of claim 4, wherein said one and said other plates are spot welded together.

6. The saw blade of claim 4, wherein said plates are strips of hardened spring steel and said blade member has a transverse thickness in the range of 1 mm to 2 mm.

7. The saw blade of claim 1, wherein said longitudinal shoulder has a transverse width not larger than half the maximum thickness of said blade member.

8. A saw blade, comprising:

an elongate blade member extending in a longitudinal direction and having top and bottom edges with inner and outer side surfaces extending on opposite sides therebetween;

said blade member comprising outer and inner strips of hardened spring steel superimposed on each other and spot welded together, said blade member having a maximum thickness between said inner and outer surfaces in the range of 1 mm to 2mm;

said inner strip extending heightwise from said bottom edge to said top edge;

said outer strip extending heightwise from said bottom edge to only partway between said bottom and top edges, an upper edge of said outer strip forming a shoulder on said outer side surface of said blade member;

said outer strip having a thickness not greater than that of said inner strip;

first, second and third types of teeth formed along said bottom edge of said blade member;

said first and third types of teeth being formed on said outer strip, and said second type of teeth being formed on said inner strip;

said first type of teeth being located at said outer side surface, being set outwards to protrude outside said outer side surface, and being ground from cutting points thereof upwardly and inwardly with respect to said blade member;

said second type of teeth being located at said inner side surface, being non-set teeth, and being ground from cutting points thereof upwardly and outwardly with respect to said blade member; and said third type of teeth being located between said outer and inner side surfaces, being set inwards, and being ground from cutting points thereof upwardly and outwardly with respect to said blade member.

* * * * *